United States Patent [19]
Sanderson et al.

[11] Patent Number: 6,071,194
[45] Date of Patent: Jun. 6, 2000

[54] RECONFIGURABLE VIDEO GAME CONTROLLER

[76] Inventors: Joel Sanderson, 19-12091 Bath Road; Kevin Dietrich, 1-12211 Cambie Road, both of Richmond, BC; Bounchanh Thanasack, 15680 99B Avenue, Surrey, BC, all of Canada

[21] Appl. No.: 08/878,999

[22] Filed: Jun. 19, 1997

[51] Int. Cl.$^7$ ........................................ A63F 9/22
[52] U.S. Cl. ............................. 463/37; 345/168
[58] Field of Search ................. 463/37, 36, 38, 463/39; 273/148 B; 345/168, 161

[56] References Cited

U.S. PATENT DOCUMENTS

| | | |
|---|---|---|
| 4,588,187 | 5/1986 | Dell . |
| 4,852,031 | 7/1989 | Brasington . |
| 4,976,435 | 12/1990 | Shatford et al. . |
| 5,259,626 | 11/1993 | Ho . |
| 5,317,505 | 5/1994 | Karabed . |
| 5,389,950 | 2/1995 | Bouton . |
| 5,396,267 | 3/1995 | Bouton . |
| 5,451,053 | 9/1995 | Garrido .................... 273/148 B |
| 5,551,701 | 9/1996 | Bouton et al. . |
| 5,576,727 | 11/1996 | Rosenberg et al. . |
| 5,691,898 | 11/1997 | Rosenberg et al. ............ 364/190 |
| 5,700,194 | 12/1997 | Hsien ........................... 463/37 |
| 5,759,100 | 8/1996 | Nakanishi ..................... 463/37 |

*Primary Examiner*—Valencia Martin-Wallace
*Assistant Examiner*—Sheila Clayton

[57] ABSTRACT

A reconfigurable video game controller for use with a video game program running on a personal computer platform, wherein the controller may be reconfigured or reprogrammed directly by the user so that user-defined keycodes are obtained from a local memory and transmitted to the computer while playing the video game. The controller is reconfigured by selecting desired input switches and then entering keycodes via an attached computer keyboard while in a setup mode, and the keycodes and selected input switch codes are transmitted to the computer for display to the user under the supervision of a reconfiguration window program. The controller is also capable of storing local codes for use in controlling operation of the controller during the video game play mode. One type of local code is a delay code useful in controlling delay of individual keycode transmissions in a multi-keycode playback sequence. Another type of local code is a force-feedback code, which is useful in controlling force-feedback control circuitry associated with the input switches such that the user can program which types of force-feedback effects are to be implemented by the controller during game play.

29 Claims, 10 Drawing Sheets

6,071,194

RECONFIGURABLE VIDEO GAME CONTROLLER

BACKGROUND OF THE INVENTION

This invention relates to video game controllers and in particular to the selective reconfiguration or reprogramming of video game controllers by the user prior to or while playing a video game.

Personal computers are widely used by those of all ages in order to interact with a variety of video game programs comprising video game and simulation programs. The video game program is controlled by control devices such as joysticks, steering wheels and the like, which are connected to industrially standardized game ports within the personal computer. Compatibility of the video game controller with the standardized game port is essential to acceptance by the mass market of users.

The standard game port is limited to four discrete inputs and four analog inputs, and the number of game boards which can be plugged into the personal computer is also limited. Thus, the number of video game controllers which can be supported by the game port, and the number of functions which can be initiated by such a video game controller is somewhat restricted.

In an attempt to alleviate these limitations, manufacturers have implemented commands which are executable via keycodes which are output in response to the selection of specific keys on a keyboard connected to a personal computer. However, the keyboard does not present a particularly realistic means of entry or control. U.S. Pat. No. 4,852,031 to Brasington discloses such a video game controller which interfaces directly to the keyboard port of the personal computer in order to emulate an aircraft cockpit control panel. By outputting certain keycodes in response to the pressing of a switch by the user, this device allows the user to control the video game program running on the computer in a more user-friendly manner than by using a standard computer keyboard to output those same keycodes.

Unfortunately, different video games often require the input of different keycodes to accomplish certain functions in the game. For example, a car chase game by one manufacturer might require the user to input the character "a" to cause the gears to shift, while a similar but not identical car chase game by another manufacturer might require the character "b" to perform that function. There is no uniformity or set of standards employed by video game developers that can be adhered to in order to ensure that a controller may operate in the same manner across different games. In addition, different types of games have different types of functions (e.g. a car chase game is inherently different from a shooting game or a space game), and thus require different keycode functionality.

Therefore, it would be advantageous for the video game controller to be able to interface to different video game programs having different keycode requirements. Also, since each video game program can potentially require a completely different set of keycodes it would be advantageous to provide a means for reconfiguring and subsequently selecting complete sets of keycode assignments which are intended for use with one or more specific video game programs, users, or personal computers.

Attempts have been made in the prior art to allow the user to reconfigure the keycodes transmitted by a given button or switch to the PC running a video game. For example, in U.S. Pat. No. 5,551,701 to Bouton et al., the user must first reconfigure the keycode assignments by utilizing a reconfiguration program running in the personal computer, and then download the reconfigured keycode assignments to the video game controller.

It would be advantageous, however, for the video game controller to be directly reconfigurable without having to first reprogram a program running on the PC and then downloading the entire file to the controller; that is, to be reconfigurable solely within the video game controller without the need for additional reconfiguration intelligence in the personal computer. This would alleviate the need for initial reconfiguration of keycode assignments in the personal computer followed by the subsequent download of keycode assignments back to the video game controller. In addition, notwithstanding the desirability of allowing the user to reprogram the keycode assignments in the video game controller directly from the keyboard, it would nonetheless be desirable to allow the user to view, in real time, the dynamically changing keycode assignments to ensure that the changed keycodes have been reprogrammed correctly.

Another problem of the prior art video game controllers is the execution delay of special functions specified by a sequence of keycodes. That is, when the user specifies that a video game controller button should output a series of sequential keycodes (e.g. a,b,c), the delay time between keycodes is fixed. While the prior art controllers allow the user to modify the keycode delay by changing a manual switch setting, this delay must remain constant for each sequence and is not an exact setting. The user can only turn a dial or move a slide switch to change the overall delay, but cannot set different delays between sequential keycodes, or have different delays from sequence to sequence. Moreover, the user has no way of finely tuning the delay to match a given requirement for game play. Further exacerbating the situation is the fact that different computers have different microprocessor speeds, thus requiring the user to fine tune the execution delay accordingly.

Therefore, it would be advantageous if the video game controller would permit the user to insert reconfigurable delays between one or more successive keycodes in order to customize the speed of executing the keycodes according to the particular personal computer.

Recently, video game controllers have been provided with a force feedback mechanism that accepts codes from the video game under execution and causes the controller or portions thereof to shake, rattle, vibrate, oscillate or otherwise move in order to provide the user with a tactile realism attributable to the game being played. For example, a video game that provides the visual image of a gravel road might send commands to a steering wheel controller to cause it to vibrate, thus helping the user to experience the gravel road by tactile feedback in addition of the visual image (and likely audio sounds of crunching gravel). An example of this technology is currently marketed by IMMERSION CORP. This force feedback technology allows the user to program a "force feedback profile" that is edited with special software running on the PC, and then downloaded to a memory in the video game controller. While the game is played, a command sent from the video game program will operate in conjunction with the force feedback profile resident in the video game controller to produce these custom force feedback effects. Again, it would be advantageous to allow the user to program such force feedback parameters directly into the video controller without requiring the PC to download the codes.

SUMMARY OF THE INVENTION

One major aspect of the present invention is a reconfigurable video game controller comprising a plurality of game input switches, a keyboard interface for connecting to a computer keyboard device and for receiving keycodes from the keyboard device when activated by a user, and processing means for controlling the operation of the video game controller. The video game controller further comprises memory means for storing a keycode assignment associated with each of the input switches, the memory means controlled by the processing means to output, during a functional mode, a keycode assignment associated with an input switch when the input switch is activated by a user, and to store, during a reconfiguration mode, a keycode assignment associated with an input switch when the input switch is activated by a user and a keycode is received from the keyboard interface. Means are provided for the user to select between the functional mode and the reconfiguration mode. Also provided is a keycode upload interface for connecting to a keyboard input port of a computer, the keycode upload interface being controlled by the processing means to output, during a functional mode, at least a portion of the keycode assignment output from the memory means such that a video game program running on the computer may utilize the portion of the keycode assignment in accordance therewith, and to output, during a reconfiguration mode, the keycode assignment being written to the memory means such that the keycode assignment may be displayed to a user via the computer.

In a second major aspect of the invention, the memory means of the reconfigurable video game controller additionally stores local control codes associated with each of the game input switches, the local control codes being utilized by the processing means to control internal operation of the controller. The keycode assignments may comprise multiple keycode assignments comprising a sequence of individual keycodes, and the local control codes may therefore comprise delay codes associated with the multiple keycode assignments which provide delays between transmission of sequential individual keycodes during the functional mode. In this aspect, the delay codes are output, during the reconfiguration mode, via the keycode upload interface. The reconfigurable video game controller may further comprise means for providing force feedback to a user during the functional mode, and means for controlling operation of the force feedback means during the functional mode in accordance with a force feedback control code operatively associated with a game input switch; in this aspect the local control codes comprise force feedback control codes.

The present invention is also a method performed in a video game playing system including a computer for running a video game program during a functional mode and displaying images controlled by the video program; and further including a video game controller operatively associated with the computer including a plurality of game input switches, a keyboard interface for connecting to a computer keyboard device and for receiving keycodes from the keyboard device when activated by a user, processing means for controlling the operation of the video game controller, and memory means for storing a keycode assignment associated with each of the input switches. The method for reconfiguring the video game controller of the present invention thus comprises the steps of invoking a reconfiguration window program on the computer, selecting a reconfiguration mode on the video game controller, activating an input switch on the video game controller, transmitting a keycode from the keyboard to the video game controller, storing the transmitted keycode in the memory means in a location associated with the activated input switch, and transmitting to the computer for display thereon the identity of the activated input switch and the keycode stored in the memory means in association therewith. This method may further comprise the steps of transmitting a start code from the computer to the video game controller after invoking the reconfiguration window program on the computer, and transmitting a response code from the video game controller to the computer in response to the receipt of the start code to indicate to the reconfiguration window program that subsequent data transfers are related to reconfiguration parameters. This method may also comprise the steps of deselecting the reconfiguring mode on the video game controller, and transmitting a stop code to the computer to indicate the end of the reconfiguration process. The keycode transmitting step may further comprise the step of transmitting a local control code for subsequent use in controlling the operation of the video game controller during the functional mode. The keycode transmitting step may further comprise the step of transmitting a sequence of keycodes to the video game controller.

In this method, the local control code may comprise a delay code associated with the multiple keycode assignment which provides a delay between transmission of sequential individual keycodes during the functional mode. The delay codes are output, during the reconfiguration mode, to the computer for display thereon.

The video game playing system may optionally further include means for providing force feedback to a user during the functional mode and means for controlling operation of the force feedback means during the functional mode in accordance with a force feedback control code operatively associated with a game input switch; in this case the local control codes may comprise force feedback control codes.

DETAILED DESCRIPTION OF THE PREFERRED EMBODIMENT

A reconfigurable video game controller of the present invention permits a user to program or reconfigure one or more sets of keycode assignments between a switch code (i.e., the signal or code which represents the selection or depression of a specific switch on the video game controller) which corresponds to the selection of one of various keys, buttons and switches found on typical video game controllers or joystick controllers by a user and a keycode or sequence of keycodes which is transmitted to a video game program running on a personal computer as a result of activating that switch. This permits a single video game controller to interface with different video game programs (e.g., video game games and simulators) each of which potentially responding to different keycodes and/or executing different functions in response to the same keycode due to variations in the keycode functions of the video game program.

Figure 1:
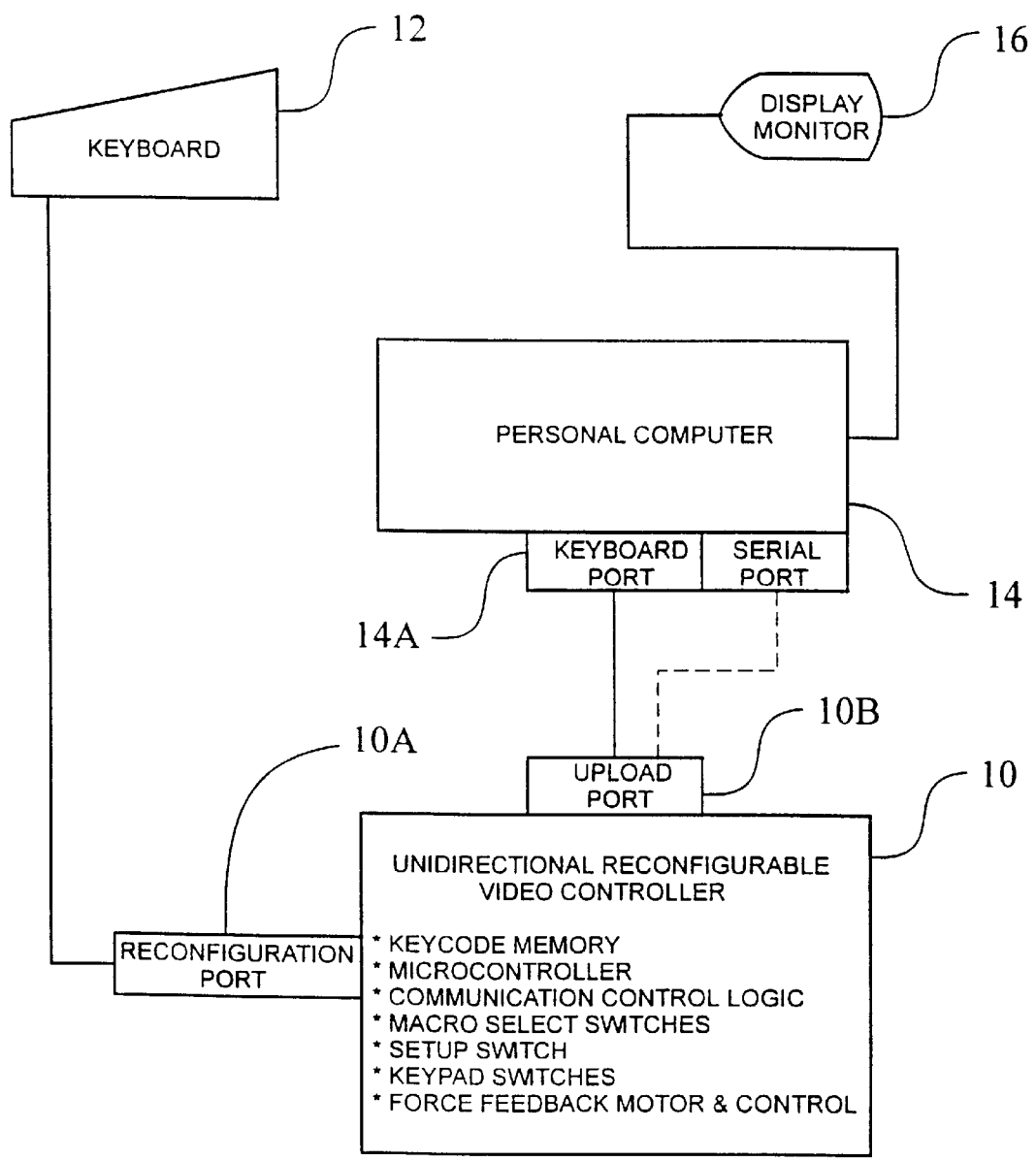
FIG. 1 is a physical block diagram of the major components of a reconfigurable video game playing system employing a reconfigurable video game controller of the present invention.

FIG. 1 illustrates the essential components of the video game system which utilizes a directly reconfigurable video game controller 10 of the present invention. An auxiliary data entry device such as a keyboard 12 is connected to a reconfiguration port 10A of the video game controller 10. A personal computer 14 is connected to a display 16 (e.g., monitor) as well known in the art and an upload port 10B of the video game controller 10 is connected to a keyboard port 14A of the personal computer 14. The manner of reconfiguring or reprogramming the video game controller 10 may also be referred to as "unidirectional" since the keycode assignments are first reconfigured by the user directly within the video game controller 10 and then transmitted to the personal computer 14 for translation by the video game program into specific actions or functions during a functional mode (i.e., during the playing of the video game or simulation) or for display to the user during reconfiguration mode. Thus, the keycode assignments are transmitted in only one direction, that is, from the video game controller 10 to the personal computer 14. This is in stark contrast to and represents an improvement over video game controllers of the prior art which require reconfiguration of keycode assignments in the memory of the personal computer 14 followed by downloading of the assignments back to the video game controller 10.

Figure 2:
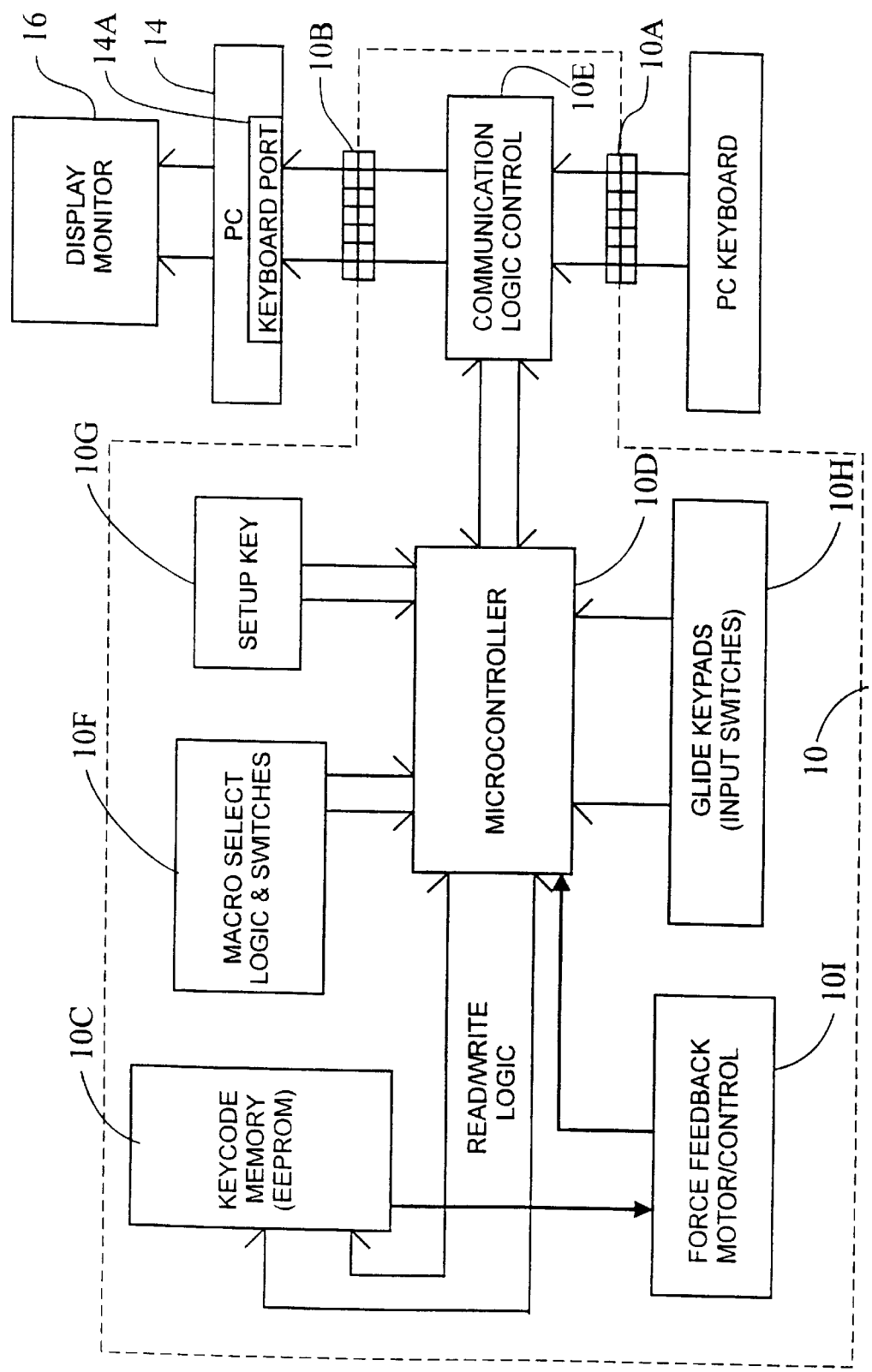
FIG. 2 is a logical block diagram of the system of FIG. 1.
Figure 3:
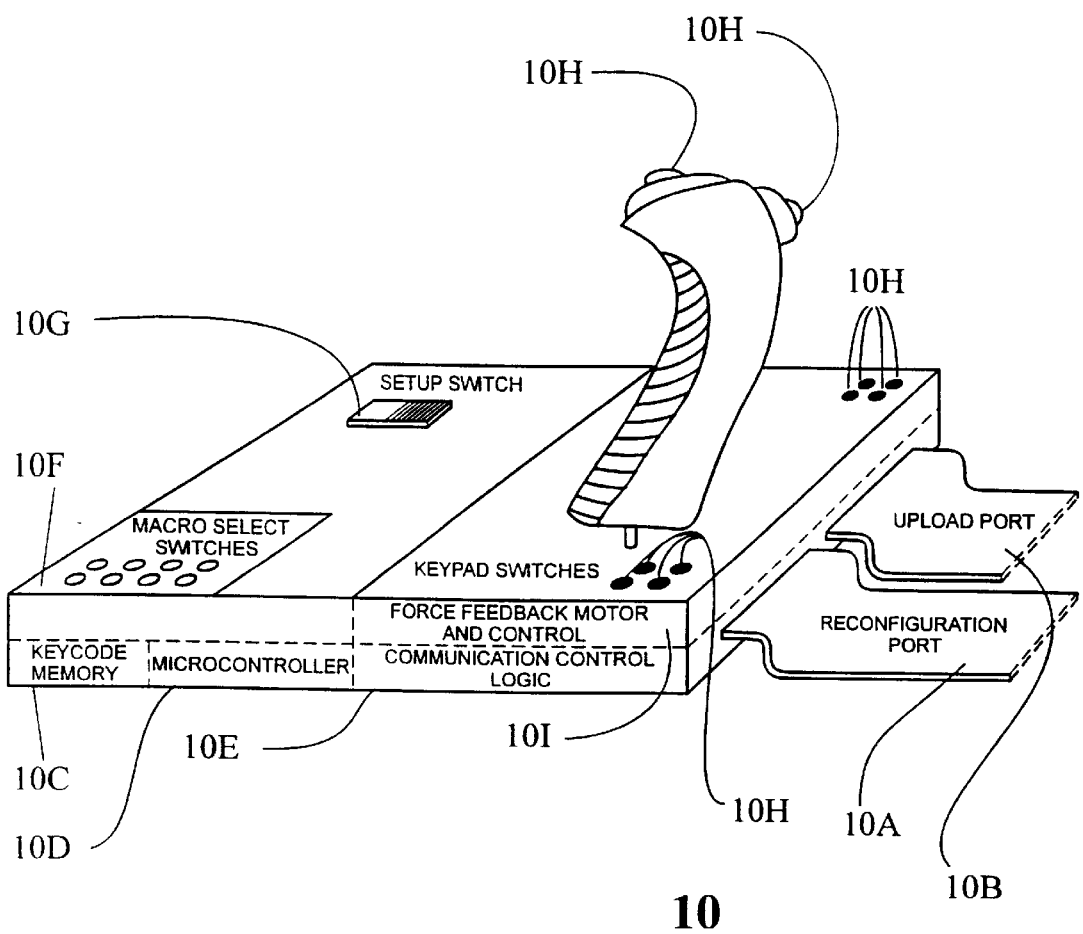
FIG. 3 is an illustration of the reconfigurable video game controller of the present invention.

FIG. 2 is an electrical block diagram of the system of the present invention, and FIG. 3 is an illustration of the reconfigurable video game controller used therein. The directly reconfigurable video game controller 10 of the present invention comprises a reconfiguration port 10A, an upload port 10B, a keycode memory 10C, a microcontroller 10D, communication control logic 10E, macro select switches 10F, a setup switch 10G, various keypad switches 10H, and a force feedback motor and control 10I. The keypad switches 10H may comprise a joystick and assorted additional switches utilized by the user during gameplay or a functional mode to control events and functions within the video game program.

The keycode memory 10C is comprised of non-volatile reprogrammable memory such as EEPROM, flash memory or non-volatile SRAM and functions as a storage medium for one or more sets of keycode assignments. The microcontroller 10D functions as a central processing unit which controls those functions not performed by the communication control logic 10E such as monitoring and application of the macro select switches 10F and storage of the keycode assignments within the keycode memory 10C. The communication control logic 10E controls data transfer through the reconfiguration port 10A and the upload port 10B. It is noted that, although the communication control logic 10E is shown logically as a separate function, it is actually implemented as a part of the firmware residing in the microcontroller 10D, and is not in this preferred embodiment a separate integrated circuit. The optional macro select switches 10F may be used to select one of a plurality of sets of keycode assignments stored in keycode memory 10C which have been specified by the user or manufacturer for use with particular video game programs, users, personal computer or other variables. The setup switch 10G functions to select between the reconfiguration mode wherein the user is permitted to reconfigure keycode assignments and the functional mode wherein the video game controller 10 transmits keycodes in accordance with the keypad switches 10H selected by the user and current keycode assignments. It is anticipated that one or more sets of default keycode assignments will be made available in order to enable the video game controller 10 to operate without the need for prior configuration or entry of an assignment for every switch in instances where the user only desires to change a relatively small number of assignments. The keypad switches 10H are selected during functional mode in order to control events (e.g., fire, jump, swing) within the video game program or during the reconfiguration mode to designate the switch code to be reconfigured.

Thus the video game controller 10 of the present invention permits the user to configure multiple sets of keycode assignments in order to transmit the desired keycode during participation in a video game program. The user can reconfigure any or all of the keycode assignments by selecting the setup switch 10G for reconfiguration mode, selecting the desired keypad switch 10H to be reconfigured, and selecting a key corresponding to the keycode that the user wishes to be transmitted in response to the keypad switch previously selected. This keycode assignment will then be stored in keycode memory 10C for subsequent use during the functional mode.

The current status of the keycode assignments may be displayed by the personal computer 14 on the display 16 by action of a reconfiguration window program resident on the personal computer 14. The display may comprise switch codes, keycodes and local codes and their interrelationship along with a graphical representation of the video game program controller 10 and the keypad switches 10H (e.g., as shown in U.S. Pat. No. 5,551,701, which is hereby incorporated by reference) or merely in textual list format. By providing such a display the user may review the current assignments in order to ensure their accuracy. It is contemplated that the video game controller 10 will transmit a complete set of the current keycode assignments pertaining to the particular selection of the macro select switches 10F upon entry into the reconfiguration mode and thereafter update the assignments individually as they are reconfigured, however, modifications to this scenario could readily be employed (e.g., merely showing those keycode assignments as they are reconfigured) while still remaining within the scope of the invention. Transmission of this information for display may be applied to alternate ports of the personal computer 14 such as the serial port 14B while staying within the scope of the present invention.

Also shown in FIG. 3 is the force feedback motor and control 10I. In order to provide an additional level of realism to the player of a video game or participant in a simulation, forces exerted on the keypad switches 10H will be modified according to the current value of certain local codes during the video game program. For example, the user will be able to program a sequence of keycodes followed by the local code which is interpreted by the force feedback motor control (i.e., force feedback codes) and applied to the force feedback motor in order to create the desired effect on one or more of the keypad switches 10H (e.g., a violent shake to the right). Force feedback technology as utilized for video game controllers is further explained, for example, in the document entitled "I-FORCE Force Feedback API", by Immersion Corporation, which may be found on the Internet at http:/www.force-feedback.com/pages/api$_{13}$ document.html, May 21, 1997, which is incorporated by reference herein.

Figure 4:
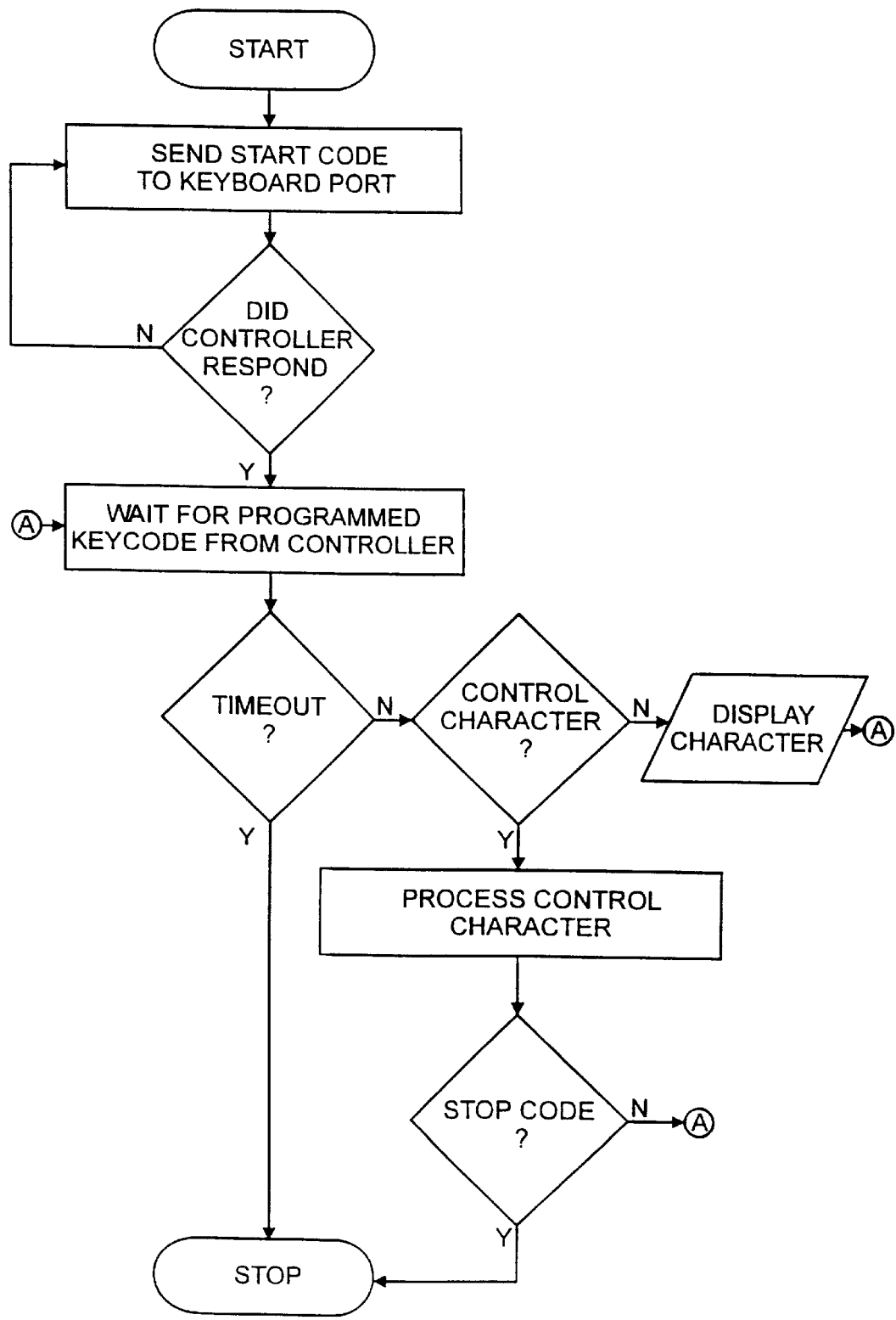
FIG. 4 is a flowchart illustrating the steps taken during a reconfiguration mode of the reconfigurable video game controller of the present invention.

FIG. 4 is an overall flowchart of the reconfiguration logic employed by the preferred embodiment of the present invention. FIGS. 6A–6D illustrate a detailed flowchart of the reconfiguration mode which segregates the steps in the flowchart into four columns representing their performance by one of the components (i.e., display, personal computer, video game controller, and keyboard) of the video game system utilizing the directly reconfigurable video game controller 10 of the present invention. The user first initiates reconfiguration window software 30 resident on the PC which transmits a start code 32 to the video game controller 10 via the upload port 10B. When the user has placed the video game controller 10 in reconfiguration mode 34 by selecting the proper setting on the setup switch 10G, the video game controller 10 will poll 36 for the occurrence of the start code, wait for an interrupt driven by the start code or alternate equivalent means of shifting control well known in the art. Upon receipt 38 of the start code the video game controller will transmit 40 an acknowledgment or response code which will be received 42 by the personal computer thus completing the handshaking protocol used to initiate the reconfiguration mode. Such a handshaking protocol could as well be accomplished by alternative equivalent means well known in the art while remaining within the scope of the present invention.

The video game controller 10 may then optionally transmit 42 a complete set of current keycode assignments in accordance with a current or default set of keycode assignments and the setting of the optional macro select switches 10F. The set of assignments would then be received 44 by the personal computer and optionally displayed 46 along with a visual representation of the video game controller 10 and keypad switches 10H in graphical format, textual format or other equivalent means well known in the art. The personal computer would then wait 48 for reconfiguration of keycode assignments.

The user may at this point optionally select 50 one of the macro select switches, thereby, designating a particular set of keycode assignments with which to associate subsequent assignments. The macro select logic switches are used as an index 52 into the keycode memory within the video game controller in order define individual sets of keycode assignments that could be accessed in relation to a specific video game, simulation program, personal computer, or other variables. The user will then select 54 a keypad switch which the user desires to reconfigure and a representation of that keypad switch (i.e., the switch code) in the form of initialization of a memory pointer or index will be applied or stored 56 to the keycode memory. The switch code, which should be adapted for transmission across the upload port and which represents the keypad switch selected by the user, is transmitted to the personal computer through its keyboard port. The personal computer will receive 60 and display 62 the switch code on the display or monitor connected to the personal computer in either the graphical or textual format described above. The personal computer will then process 64 the switch code in order to determine 66 whether it represents a predefined "stop" code, and if it does, then exit from the reconfiguration mode. The stop code is sent by the controller when the user switches out of the setup mode (i.e., back to the normal, or functional mode). If the switch code does not represent a stop code, then the personal computer will wait 68 for the transmission of keycodes to be transmitted in relation to the switch code already transmitted.

The user would then select 70 a key via the keyboard which the user wishes to associate with the switch code previously transmitted, which would be received 72 and stored 74 in keycode memory (in association with the already selected switch code) by the video game controller and transmitted 76 to the personal computer. The personal computer would then receive 78 and display 80 the keycode on the display. At this time the personal computer may wait 82 for a local code which represents an optional, user-configurable local parameter such as the delay between the transmission of each keycode in a multi-keycode sequence executed during the functional mode. For example, the user can specify 0.5 seconds between the first and second keycodes corresponding to a particular switch code and 0.55 seconds between the second and third keycodes in a multi-keycode sequence. As currently implemented, the user may specify any delay setting between 0.1 seconds to 2 seconds in increments of 0.1. seconds, however, such parameters could be varied while remaining within the scope of the present invention. The ability to program the delay between sequential keycodes in a multi-keycode sequence is an improvement over the prior art and gives great advantages as already described. The delay code could then be selected 84 via the keyboard, received 86 and stored 88 in keycode memory by the video game controller and transmitted 90 to the personal computer. The personal computer could optionally display 94 the received delay code with the associated switch code and keycode information from the relevant keycode assignment on the display for viewing and verification by the user.

In order to provide greater realism during the user's participation in a video game program, the user may select keys at step 100 on the keyboard which represent force feedback codes (i.e., another type of local code) which are then received 102 by the video game controller and stored 104 in keycode memory. The force feedback code may optionally be transmitted 106 to the personal computer and received 108 by the display for verification by the user in a graphical or textual format 110. The process may then wait 112 for additional force feedback codes to be programmed by the user.

If additional keycodes are to be entered, then the flow would return to selection 70 of subsequent keys representing keycodes by the user indicated by node A. If, however, the user does not desire to enter any further keycodes for the particular switch code being reconfigured and the setup switch is still set for reconfiguration mode, then the flow would return to selection of further input switches indicated by node B. If the reconfiguration mode was deselected via the setup switch, then a stop code would be transmitted 96 by the video game controller to the personal computer indicated by node C.

It is important to note that, although there is a start code which is sent from the personal computer 14 to the video game controller 10 to initiate the reconfiguration mode, the present invention may still be referred to as performing unidirectional reconfiguration 98 since the keycode assignments are only transferred from the video game controller 10 to the personal computer 14 and not from the personal computer 14 to the video game controller 10 as is taught by the prior art.

Figure 5A:
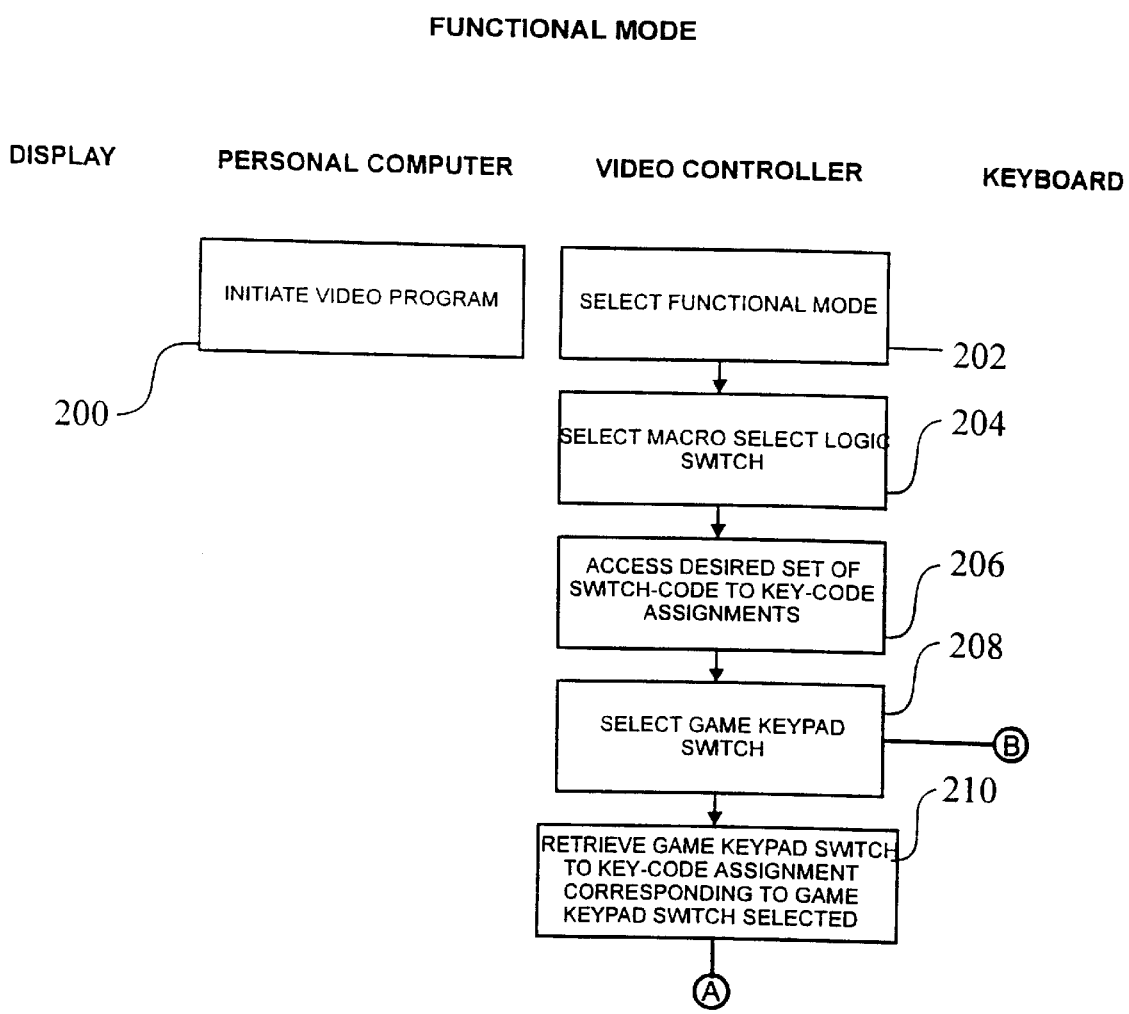
FIGS. 5A–5B are a flowchart illustrating the steps taken during a functional mode of the reconfigurable video game controller of the present invention.
Figure 5B:
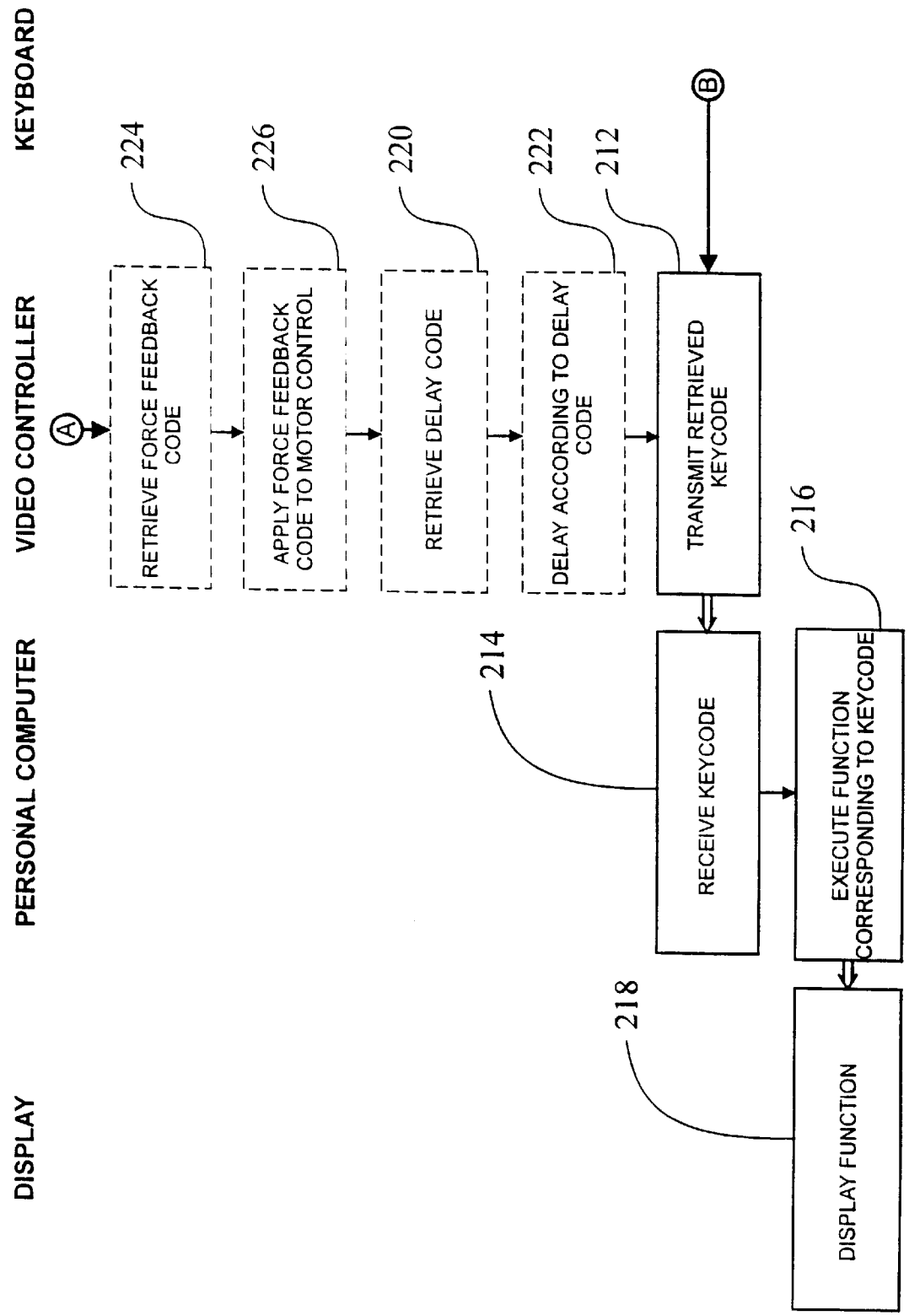
Figure 6A:
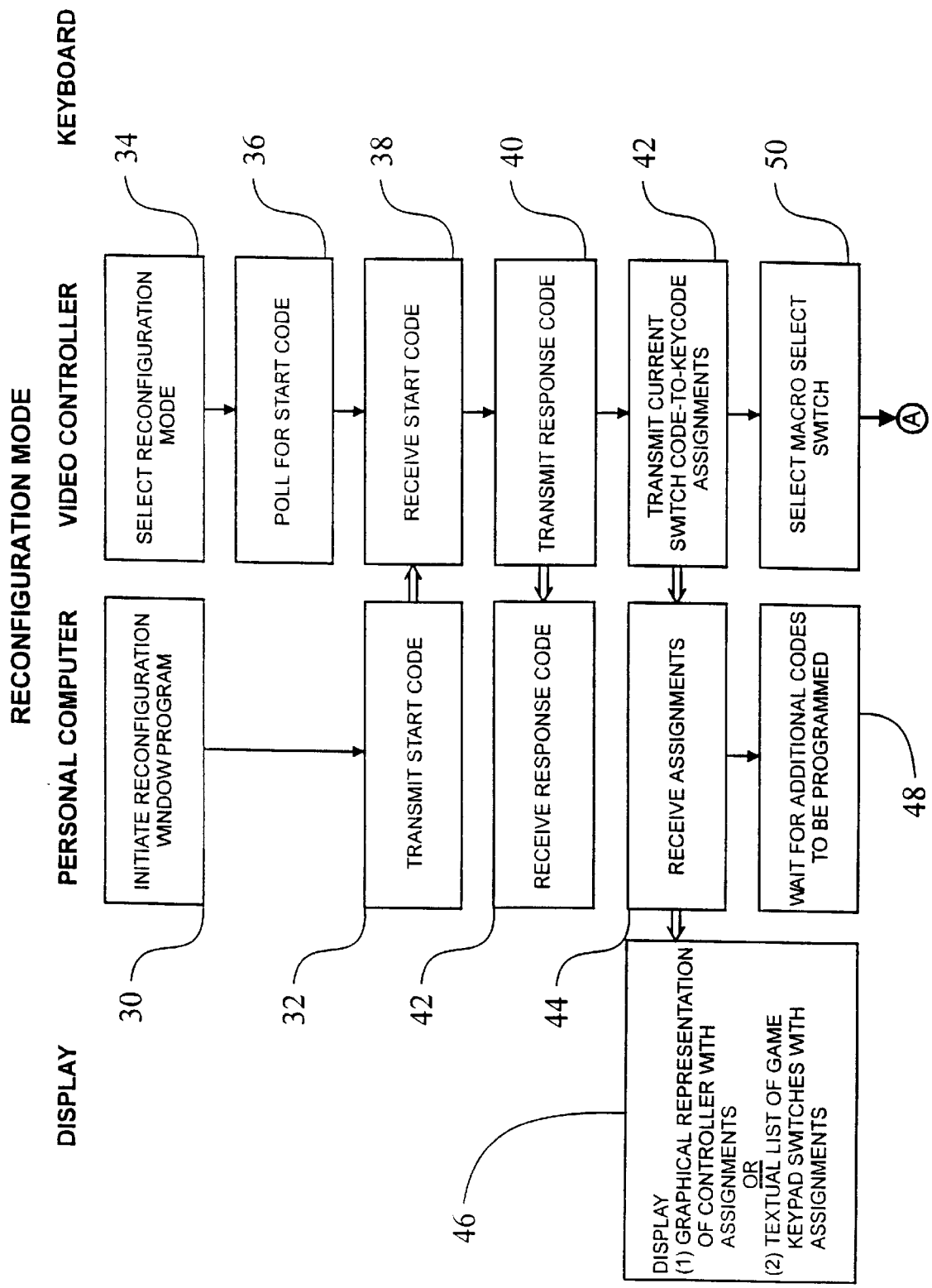
FIGS. 6A–6D are a flowchart illustrating the steps taken during a reconfiguration mode of the reconfigurable video game controller of the present invention
Figure 6B:
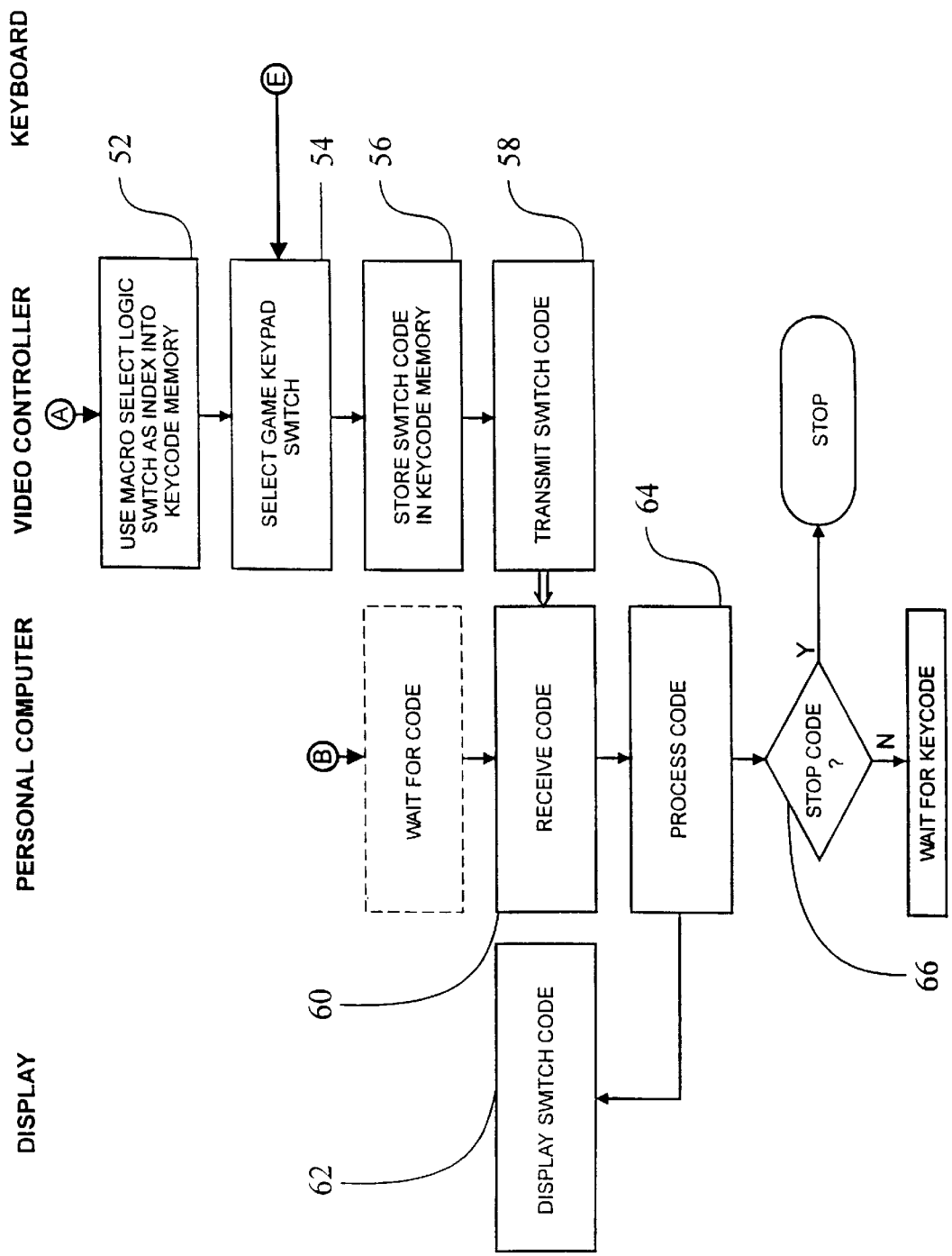
Figure 6C:
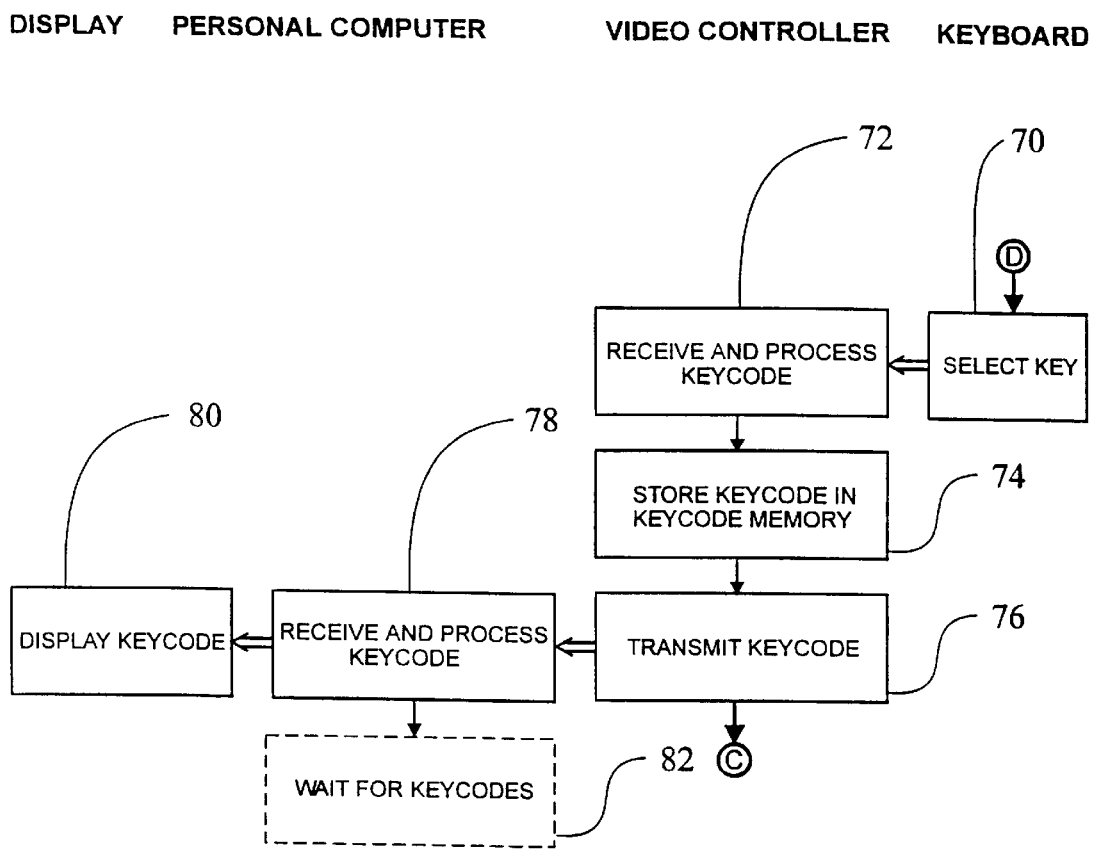
Figure 6D:
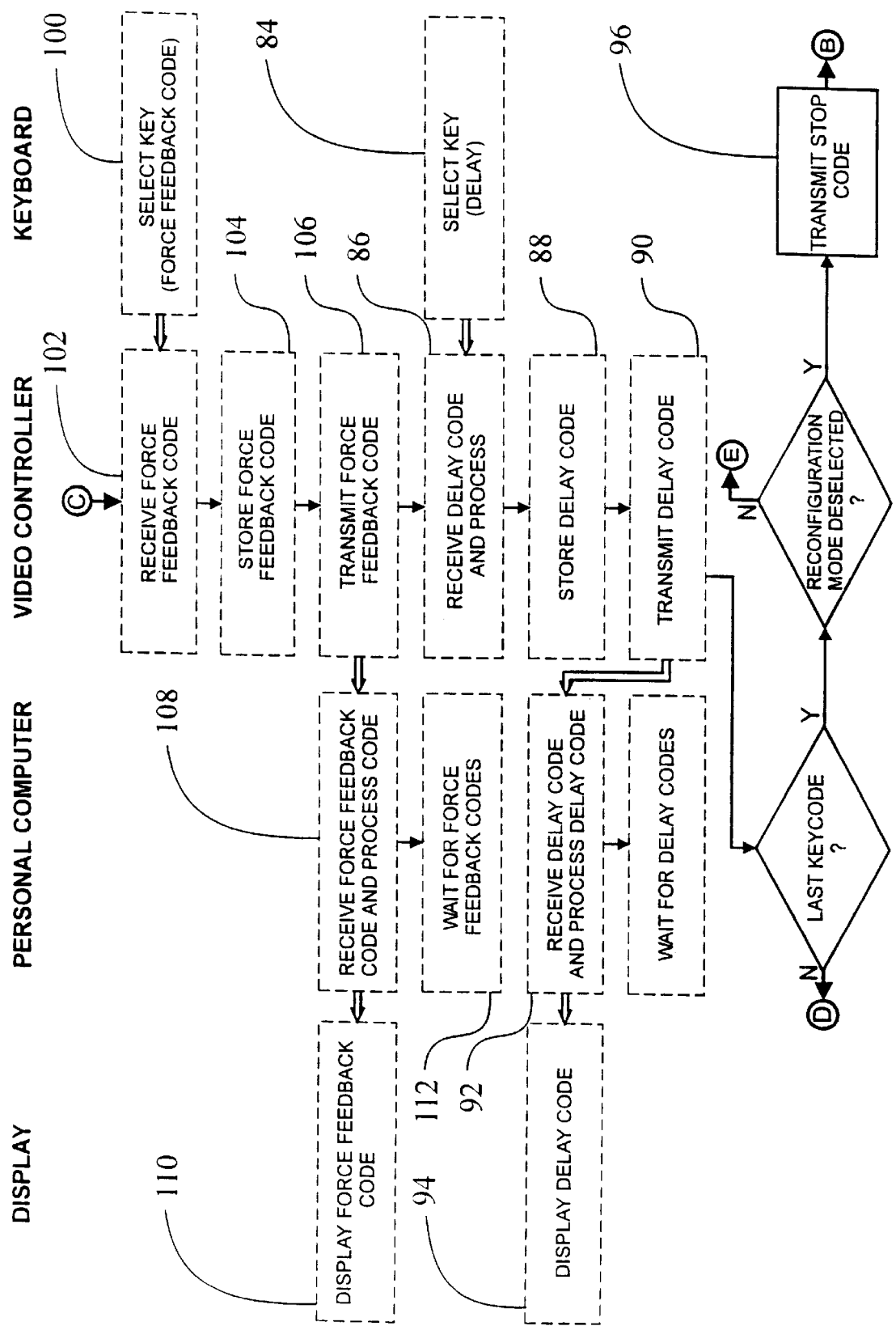

FIGS. 5A–5B illustrate a flowchart of a functional mode which also segregates the steps in the flowchart into four columns representing their performance by one of the components (i.e., display, personal computer, video game controller, and keyboard) of the video game system utilizing the directly reconfigurable video game controller 10 of the present invention. The functional mode represents the mode that the video game controller is placed in during participation by the user in the video game program. The user will most likely initiate 200 the video game program through invocation on the personal computer while the functional mode has been selected 202 by the setup switch located on the video game controller. The user may then optionally select 204 a desired macro select switch associated with, for instance, the video game program which has been initiated 200. The value associated with the macro select switch selected will be used as an index or pointer to access 206 the desired set of keycode assignments. The user will then begin playing the video game or simulation which involves selecting 208 a keypad switch. The switch code associated with the keypad switch selected will be used to retrieve 210 the relevant keycode assignment and thus the keycode associated with the selected switch code from the keycode memory. The retrieved keycode will then be transmitted 212 by the video game controller and received 214 by the personal computer which will then execute 216 and display 218 the function specified according to the particular video game program initiated. Optionally, between retrieving 210 successive keycodes in a multi-key assignment, the video game controller may retrieve delay codes at step 220 and delay 222 the transmission of subsequent keycodes in the multi-keycode sequence. In addition, the video game controller may retrieve force feedback codes at step 224 and apply these force feedback codes to the force feedback motor control in order to generate greater tactile realism to the user by operation of the force feedback motor on one or more keypad switches 10H (e.g., joystick, steering wheel or other input devices well known in the art).

Although the invention has been shown and described with respect to best mode embodiments thereof, it should be understood by those skilled in the art that the foregoing and various other changes, omissions and additions in the form and detail thereof may be made therein without departing from the spirit and scope of the invention.

We claim:

1. A reconfigurable video game controller comprising:
   a) a plurality of game input switches;
   b) a keyboard interface for connecting to a computer keyboard device and for receiving keycodes from said keyboard device when activated by a user;
   c) processing means for controlling the operation of said video game controller;
   d) memory means for storing a keycode assignment associated with each of said input switches, said memory means controlled by said processing means:
      (i) to output, during a functional mode, the keycode assignment associated with an input switch when said input switch is activated by the user, and
      (ii) to store, during a reconfiguration mode, the keycode assignment associated with an input switch when said input switch is activated by the user and the keycode is received directly from said keyboard device via said keyboard interface;
   e) means for the user to select between said functional mode and said reconfiguration mode;
   f) a keycode upload interface for connecting to a keyboard input port of a computer, said keycode upload interface controlled by said processing means:
      (i) to output, during a functional mode, at least a portion of said keycode assignment output from said memory means such that a video game program running on said computer may utilize said portion of said keycode assignment in accordance therewith; and
      (ii) to output, during a reconfiguration mode, said keycode assignment being written to said memory means such that said keycode assignment may be displayed to a user via said computer.

2. The reconfigurable video game controller of claim 1, wherein said keycode upload interface outputs, upon selection by said user of said reconfiguration mode, a default set of keycode assignments previously stored in said memory means.

3. The reconfigurable video game controller of claim 1 wherein said memory means stores multiple sets of keycode assignments, and further comprising means for the user to select one of said sets of keycode assignments for use in said functional mode or said reconfiguration mode.

4. The reconfigurable video game controller of claim 1 wherein said memory means additionally stores local control codes associated with each of said game input switches, said local control codes being utilized by said processing means to control internal operation of said controller.

5. The reconfigurable video game controller of claim 4 wherein said keycode assignments comprise multiple keycode assignments comprising a sequence of individual keycodes.

6. The reconfigurable video game controller of claim 5 wherein said local control codes comprise delay codes associated with said multiple keycode assignments which provide delays between transmission of sequential individual keycodes during said functional mode.

7. The reconfigurable video game controller of claim 6 wherein said delay codes are output, during said reconfiguration mode, via said keycode upload interface.

8. The reconfigurable video game controller of claim 4 further comprising
   means for providing force feedback to a user during said functional mode, and
   means for controlling operation of said force feedback means during said functional mode in accordance with a force feedback control code operatively associated with a game input switch;
   wherein said local control codes comprise force feedback control codes.

9. A reconfigurable video game controller comprising:
   a) a plurality of game input switches;
   b) a keyboard interface for connecting to a computer keyboard device and for receiving keycodes from said keyboard device when activated by a user;
   c) processing means for controlling the operation of said video game controller;
   d) memory means for storing a keycode assignment associated with each of said input switches, said memory means controlled by said processing means:
      (i) to output, during a functional mode, said keycode assignment associated with an input switch when said input switch is activated by said user, and
      (ii) to store, during a reconfiguration mode, local control codes associated with each of said game input switches, the local control codes being received directly from said keyboard device via said keyboard interface; said local control codes being utilized by said processing means to control internal operation of said controller; and
   e) means for the user to select between said functional mode and said reconfiguration mode.

10. The reconfigurable video game controller of claim 9 wherein said keycode assignments comprise multiple keycode assignments comprising a sequence of individual keycodes.

11. The reconfigurable video game controller of claim 10 wherein said local control codes comprise delay codes associated with said multiple keycode assignments which provide delays between transmission of sequential individual keycodes during said functional mode.

12. The reconfigurable video game controller of claim 11 wherein said delay codes are output, during said reconfiguration mode, via a keycode upload interface.

13. The reconfigurable video game controller of claim 9 further comprising means for providing force feedback to a user during said functional mode, and means for controlling operation of said force feedback means during said functional mode in accordance with a force feedback control code operatively associated with a game input switch;

wherein said local control codes comprise force feedback control codes.

14. A video game playing system comprising:
(I) a computer comprising;
  (a) means for running a video game program during a functional mode;
  (b) means for displaying images controlled by said video game program;
  (c) a keyboard input port for receiving keycodes suitable for controlling said video game program;
  (d) means for executing a keycode reconfiguration program, said reconfiguration program causing said keycodes to be displayed on said display means during said video game controller reconfiguration mode; and
(II) a reconfigurable video game controller comprising:
  (a) a plurality of game input switches;
  (b) a keyboard interface for connecting to a computer keyboard device and for receiving said keycodes from said keyboard device when activated by a user;
  (c) processing means for controlling the operation of said video game controller;
  (d) memory means for storing a keycode assignment associated with each of said input switches, said memory means controlled by said processing means:
    (i) to output, during said functional mode, the keycode assignment associated with said input switch when said input switch is activated by the user, and
    (ii) to store, during said reconfiguration mode, the keycode assignment associated with an input switch when said input switch is activated by the user and the keycode is received directly from said keyboard device via said keyboard interface;
  (e) means for the user to select between said functional mode and said reconfiguration mode;
  (f) a keycode upload interface for connecting to said keyboard input port of said computer, said keycode upload interface controlled by said processing means:
    (i) to output, during said functional mode, at least a portion of said keycode assignment output from said memory means such that a video game program running on said computer may utilize said portion of said keycode assignment in accordance therewith; and
    (ii) to output, during said reconfiguration mode, said keycode assignment being written to said memory means such that said keycode assignment may be displayed to a user via said computer.

15. The video game playing system of claim 14, wherein said keycode upload interface outputs, upon selection by said user of said reconfiguration mode, a default set of keycode assignments previously stored in said memory means.

16. The video game playing system of claim 14 wherein said memory means stores multiple sets of keycode assignments, and further comprising means for the user to select one of said sets of keycode assignments for use in said functional mode or said reconfiguration mode.

17. The video game playing system of claim 14 wherein said memory means additionally stores local control codes associated with each of said game input switches, said local control codes being utilized by said processing means to control internal operation of said controller.

18. The video game playing system of claim 14 wherein said keycode assignments comprise multiple keycode assignments comprising a sequence of individual keycodes.

19. The video game playing system of claim 18 wherein said local control codes comprise delay codes associated with said multiple keycode assignments which provide delays between transmission of sequential individual keycodes during said functional mode.

20. The video game playing system of claim 19 wherein said delay codes are output, during said reconfiguration mode, via said keycode upload interface.

21. The reconfigurable video game controller of claim 17 further comprising means for providing force feedback to a user during said functional mode, and means for controlling operation of said force feedback means during said functional mode in accordance with a force feedback control code operatively associated with a game input switch;

wherein said local control codes comprise force feedback control codes.

22. In a video game playing system including a computer for running a video game program during a functional mode and displaying images controlled by said video program; and further including a video game controller operatively associated with said computer including a plurality of game input switches, a keyboard interface for connecting to a computer keyboard device and for receiving keycodes from the keyboard device when activated by a user, processing means for controlling the operation of the video game controller, and memory means for storing a keycode assignment associated with each of the input switches;

a method for reconfiguring the video game controller comprising the steps of:
  (a) invoking a reconfiguration window program on the computer;
  (b) selecting a reconfiguration mode on the video game controller;
  (c) activating an input switch on the video game controller;
  (d) transmitting a keycode from said keyboard to said video game controller;
  (e) storing the keycode received directly from the keyboard device in the memory means in a location associated with the activated input switch; and
  (f) transmitting to the computer for display thereon the identity of the activated input switch and the keycode stored in the memory means in association therewith.

23. The method of claim 22 further comprising the is steps of:

transmitting a start code from said computer to said video game controller after invoking the reconfiguration window program on the computer; and transmitting a response code from the video game controller to the computer in response to the receipt of the start code to indicate to the reconfiguration window program that subsequent data transfers are related to reconfiguration parameters.

24. The method of claim 23 further comprising the steps of:

deselecting the reconfiguring mode on the video game controller; and transmitting a stop code to the computer to indicate the end of the reconfiguration process.

25. The method of claim 22 in which said keycode transmitting step further comprises the step of transmitting a local control code for subsequent use in controlling the operation of said video game controller during the functional mode.

26. The method of claim 25 in which said keycode transmitting step comprises the step of transmitting a sequence of keycodes to said video game controller.

27. The method of claim 26 in which said local control code comprises a delay code associated with said multiple keycode assignment which provides a delay between transmission of sequential individual keycodes during said functional mode.

28. The method of claim 27 wherein said delay codes are output, during said reconfiguration mode, to said computer for display thereon.

29. The method of claim 25 in which said video game playing system further includes means for providing force feedback to a user during said functional mode and means for controlling operation of said force feedback means during said functional mode in accordance with a force feedback control code operatively associated with a game input switch; and wherein said local control codes comprise force feedback control codes.

* * * * *

UNITED STATES PATENT AND TRADEMARK OFFICE
CERTIFICATE OF CORRECTION

PATENT NO. : 6,071,194
DATED : June 6, 2000
INVENTOR(S) : Sanderson, et. al.

It is certified that error appears in the above-indentified patent and that said Letters Patent is hereby corrected as shown below:

Title page, item [73], Assignee: should read --ACT Labs, Ltd., Richmond, British Columbia, Canada--.

Signed and Sealed this

Twentieth Day of March, 2001

Attest:

NICHOLAS P. GODICI

*Attesting Officer*     *Acting Director of the United States Patent and Trademark Office*